US008743268B2

(12) United States Patent
Kawahara

(10) Patent No.: US 8,743,268 B2
(45) Date of Patent: Jun. 3, 2014

(54) IMAGE CAPTURING APPARATUS, CONTROL METHOD THEREFOR, AND PROGRAM FOR CORRECTING SHIFT BASED ON SHIFT AMOUNT IN IMAGE PLANE

(75) Inventor: Hideo Kawahara, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/327,017

(22) Filed: Dec. 3, 2008

(65) Prior Publication Data

US 2009/0153725 A1    Jun. 18, 2009

(30) Foreign Application Priority Data

Dec. 18, 2007  (JP) ................................. 2007-326586

(51) Int. Cl.
  *H04N 5/232*  (2006.01)
  *H04N 5/228*  (2006.01)
  *G03B 17/00*  (2006.01)

(52) U.S. Cl.
  USPC ................... 348/347; 348/208.1; 348/208.16; 396/52; 396/53; 396/54

(58) Field of Classification Search
  USPC ............... 348/347, 208.1–208.16; 396/52–55
  See application file for complete search history.

(56) References Cited

U.S. PATENT DOCUMENTS

| 5,907,353 | A * | 5/1999 | Okauchi ..................... 348/218.1 |
| 6,734,901 | B1 * | 5/2004 | Kudo et al. ................. 348/208.4 |
| 2001/0012059 | A1 * | 8/2001 | Kudo ............................ 348/208 |
| 2006/0055788 | A1 * | 3/2006 | Kawabe .................... 348/208.12 |
| 2007/0147813 | A1 * | 6/2007 | Washisu .......................... 396/53 |
| 2008/0079814 | A1 * | 4/2008 | Nobuoka ................. 348/208.99 |

FOREIGN PATENT DOCUMENTS

| JP | 04-117077 A | 4/1992 |
| JP | 07-177425 | 7/1995 |
| JP | 2003-255424 A | 9/2003 |
| JP | 2007-324929 A | 12/2007 |

OTHER PUBLICATIONS

Information Processing Society of Japan Jul. 1976, vol. 17 No. 7 p. 634-640. Image Registration by the Sequential Similarity Detection Algorithm. Morio Onoe et al. (Japanese Document with English Translation).
The above references were cited in a Oct. 28, 2011 Japanese Office Action, which is enclosed without an English Translation, that issued in Japanese Patent Application No. 2007-326586.

* cited by examiner

*Primary Examiner* — Joel Fosselman

(74) *Attorney, Agent, or Firm* — Cowan, Liebowitz & Latman, P.C.

(57) ABSTRACT

An image capturing apparatus comprises an image capturing unit, a motion vector detection unit which detects a motion vector quantity representing a shift amount between images from image signals successively obtained by the image capturing unit, an angle conversion unit which converts the motion vector quantity into an angular displacement amount between the images on the basis of a zoom position of the zoom lens, a shift angle calculation unit which calculates a shift angle from an optical axis of the imaging optical system by calculating the angular displacement amount, a shift amount conversion unit which converts the shift angle into a shift amount on an image plane of the image capturing unit on the basis of the zoom position of the zoom lens, and a correction unit which corrects a shift on the basis of the shift amount on the image plane.

8 Claims, 10 Drawing Sheets

Prior Art

Prior Art

Prior Art

IMAGE CAPTURING APPARATUS, CONTROL METHOD THEREFOR, AND PROGRAM FOR CORRECTING SHIFT BASED ON SHIFT AMOUNT IN IMAGE PLANE

BACKGROUND OF THE INVENTION

1. Field of the Invention

The present invention relates to a technique of correcting blurring of a captured image caused by camera shake by using motion vector detection information obtained from blurring of a moving image.

2. Description of the Related Art

An image capturing apparatus such as a video camera which captures a moving image suffers image blurring owing to camera shake when the lens zooms to the telephoto end. To prevent image blurring caused by camera shake, there has conventionally been proposed a technique of detecting the motion vector of an image from a captured image signal and correcting image blurring based on the motion vector.

Known examples of the conventional method of detecting the motion vector of a moving image are a correlation method based on correlation calculation, and block matching.

According to block matching, an input image signal is divided into a plurality of blocks (e.g., eight pixels×eight lines) of a proper size. Differences from pixels in a predetermined range of a preceding field (or frame) are calculated for each block. A block of a preceding field (or frame) in which the sum of the absolute values of the differences becomes minimum is searched for. The relative shift between frames represents the motion vector of the block.

Matching calculation is discussed in detail in Morio Onoe, et al., "Information Processing", Vol. 17, No. 7, pp. 634-640, July 1976.

An example of a conventional motion vector detection method using block matching will be explained with reference to FIG. 7. FIG. 7 is a schematic block diagram of an apparatus which prevents blurring according to a conventional motion vector detection method.

An image signal (field or frame) subjected to motion vector detection is input via an input terminal 101 to an image memory 110 and a filter 102 for extracting the spatial frequency. The image memory 110 temporarily stores the image signal. The filter 102 extracts, from the image signal, a spatial frequency component useful for motion vector detection. That is, the filter 102 removes the low and high spatial frequency components of the image signal.

The image signal having passed through the filter 102 is input to a binarization circuit 103. The binarization circuit 103 binarizes the image signal using zero level as a reference. More specifically, the binarization circuit 103 outputs the sign bit of the output signal.

The binary image signal is input to a correlation calculation circuit 104 and a memory 105 serving as a 1-field period delay means. The correlation calculation circuit 104 further receives an image signal of a preceding field from the memory 105.

According to block matching, the correlation calculation circuit 104 divides the image area into a plurality of block areas of a proper size, as described above. The correlation calculation circuit 104 calculates the correlation between the current and preceding fields for each block, and outputs the resultant correlation value to a motion vector detection circuit 106. The motion vector detection circuit 106 detects the motion vector of each block from the calculated correlation value. More specifically, the motion vector detection circuit 106 searches for a block of a preceding field having a minimum correlation value. The motion vector detection circuit 106 detects the relative shift between the blocks of the current and preceding fields as a motion vector quantity.

The motion vector quantity of each block is input to a motion vector determination circuit 107. The motion vector determination circuit 107 determines the motion vector quantity (representative vector quantity) of an entire image from the motion vectors of respective blocks. More specifically, the motion vector determination circuit 107 determines the median or average of motion vector quantities of respective blocks as the motion vector quantity of the entire image. An integrating circuit 108 integrates the motion vector quantity of the entire image obtained by the motion vector determination circuit 107, converting it into an integrated motion vector quantity.

A memory read control circuit 109 controls the readout position in the image memory 110 so as to cancel image blurring in accordance with the integrated motion vector quantity. Then, the image memory 110 outputs a blurring-corrected image signal.

A representative vector detection circuit 21 includes the filter 102, binarization circuit 103, correlation calculation circuit 104, memory 105, motion vector detection circuit 106, and motion vector determination circuit 107.

FIG. 8 is a block diagram showing a state in which the above-described arrangement is assembled into an image capturing apparatus such as a video camera.

In FIG. 8, the image capturing apparatus comprises a motor-driven zoom lens made up of a zoom lens 10, a zoom switch 33 operated by the user to drive the zoom lens 10 and change the zoom ratio, a zoom control circuit 32 which controls a zoom motor in accordance with the state of the zoom switch 33, a zoom motor 31, and a zoom encoder 34 which detects the position of the zoom lens 10. The position of the zoom lens 10 changes in accordance with the operation of the zoom switch 33. More specifically, it is controlled to move the zoom lens 10 to a target position by driving the zoom motor 31 via the zoom control circuit 32 in accordance with zoom position information input from the zoom switch 33 so that the zoom encoder 34 obtains a value matching the position information.

An object image formed via the zoom lens 10 and a main optical system 11 on the light receiving surface of an image sensor 12 formed from a CCD or the like is converted into an electrical signal. A camera signal processing circuit 13 converts the electrical signal into a standard video signal or the like as an image signal.

The video signal obtained by the camera signal processing circuit 13 is input to the image memory 110, and also to the representative vector detection circuit 21. The representative vector detection circuit 21 outputs the motion vector quantity of an entire image. The integrating circuit 108 integrates the motion vector quantity of the entire image obtained by the representative vector detection circuit 21, converting it into an integrated motion vector quantity. The memory read control circuit 109 controls the readout position in the image memory 110 so as to cancel image blurring in accordance with the integrated motion vector quantity. A blurring-corrected image signal is output from the image memory 110, and recorded by a recorder 17.

A reference related to this technique is Japanese Patent Laid-Open No. 7-177425.

When an image capturing apparatus having the above-described arrangement executes a zoom operation, the following problems arise.

(1) When zoom control is performed to change the focal length from a large value to a small one, the correction angle corresponding to the integrated motion vector quantity increases upon the change of the focal length.

(2) To the contrary, when zoom control is performed to change the focal length from a small value to a large one, the correction angle corresponding to the integrated motion vector quantity decreases upon the change of the focal length.

This phenomenon will be explained with reference to FIG. 9.

FIG. 9 is a graph showing an example of the angular displacement and the image shift from the center of the optical axis on the image capturing plane with respect to the focal length. Even if the angular displacement is constant, the image shift from the center of the optical axis on the image capturing plane changes in accordance with the focal length. A characteristic 47 in FIG. 9 represents an image shift from the center of the optical axis in accordance with the focal length for an angular displacement of 1 deg from the optical axis. Similarly, characteristics 46 and 45 represent image shifts from the center of the optical axis in accordance with the focal length for angular displacements of 2 deg and 3 deg.

A case where the zoom lens is driven to change the focal length of the lens from a (long focal length) to b (short focal length) will be examined.

Even if no vector quantity is detected (the vector quantity is 0) upon a change of the angle of view in zoom driving, when the motion vector quantity integrated by the integrating circuit 108 indicates a shift 41 on the image capturing plane at a focal length a, the shift 41 becomes equal to a shift 42 at a focal length b as a result of the zoom operation. When the shift is converted into a change of the angle from the optical axis, the 1-deg angle represented by the characteristic 47 is replaced with the 3-deg angle represented by the characteristic 45.

The relationship between the image shift from the center of the optical axis on the image capturing plane, the angle (angular displacement) from the optical axis, and the focal length is generally given by $$l = f \times \tan \theta$$

l: image shift from the center of the optical axis
f: focal length
θ: angular displacement from the optical axis That is, the zoom operation changes the camera shake correction angle. The zoom operation impairs the continuity of the correction angle, so a change between images during and after zooming becomes unnatural.

The unnatural change becomes more conspicuous as the focal length changes much more in the zoom operation and as the camera shake correction angle is larger in the zoom operation.

Further, a vector quantity detection error occurs when the object moves upon a change of the angle of view in the zoom operation without any camera shake.

A case where an image shown in FIG. 10A is captured by increasing the focal length (from the wide-angle side to the telephoto side) by the zoom operation will be exemplified.

In FIG. 10A, a captured image 201 within the image capturing range is read out from the image sensor. A block 202 is obtained by dividing the obtained captured image into blocks in order to perform block matching, as described above. Reference numerals 211 and 212 denote objects.

The captured image changes into one shown in FIG. 10B as a result of the zoom operation to set an area 204 shown in FIG. 10A to the image capturing angle of view.

Even if the captured image is free from blurring caused by camera shake or the like in the zoom operation, vector quantities as shown in FIG. 11 are detected. In FIG. 11, arrows 222 indicate detected vector quantities along with movement of the object 211 and that of the object 212 upon a change of the angle of view. Points 223 represent blocks in which no vector quantity is detected because no object exists (matching fails).

In FIG. 11, the motion vector quantity of an entire image obtained by the motion vector determination circuit 107 is a vector quantity indicated by an arrow 221 when calculating the median or average of motion vectors of respective blocks.

This means a motion vector quantity detection error caused by movement of an object upon a change of the angle of view in the zoom operation without any camera shake.

The detected vector quantity changes depending on the zoom speed. As a change of the angle of view per unit time is larger, a larger vector quantity is detected. That is, when the zoom speed is high, the vector detection error becomes large, and the malfunction is more frequently caused by the detection error.

SUMMARY OF THE INVENTION

The present invention has been made to overcome the conventional drawbacks, and has as its object to prevent a decrease in correction precision of camera shake upon zooming in an image capturing apparatus such as a video camera.

To solve the above-described problems and achieve the above-described object, according to the first aspect of the present invention, there is provided an image capturing apparatus comprising an image capturing unit which converts, into an image signal, an object image formed by an imaging optical system including a zoom lens, a motion vector detection unit which detects a motion vector quantity representing a shift amount between images from image signals successively obtained by the image capturing unit, an angle conversion unit which converts the motion vector quantity detected by the motion vector detection unit into an angular displacement amount between the images on the basis of a zoom position of the zoom lens, a shift angle calculation unit which calculates a shift angle from an optical axis of the imaging optical system by calculating the angular displacement amount obtained by the angle conversion unit; a shift amount conversion unit which converts the shift angle calculated by the shift angle calculation unit into a shift amount on an image plane of the image capturing unit on the basis of the zoom position of the zoom lens; and a correction unit which corrects a shift on the basis of the shift amount on the image plane.

According to the second aspect of the present invention, there is provided a method of controlling an image capturing apparatus including an image capturing unit which converts, into an image signal, an object image formed by an imaging optical system including a zoom lens, the method comprising a motion vector detection step of detecting a motion vector quantity representing a shift amount between images from image signals successively obtained by the image capturing unit, an angle conversion step of converting the motion vector quantity detected in the motion vector detection step into an angular displacement amount between the images on the basis of a zoom position of the zoom lens, a shift angle calculation step of calculating a shift angle from an optical axis of the imaging optical system by calculating the angular displacement amount obtained in the angle conversion step, a shift amount conversion step of converting the shift angle into a shift amount on an image plane of the image capturing unit on the basis of the zoom position of the zoom lens, and a correction step of correcting a shift on the basis of the shift amount on the image plane.

Further features of the present invention will become apparent from the following description of exemplary embodiments with reference to the attached drawings.

DESCRIPTION OF THE EMBODIMENTS

Preferred embodiments of the present invention will be described below.

An outline of the embodiments of the present invention will be explained first. In an image capturing apparatus according to the embodiments of the present invention, a detected vector quantity (=pixel moving amount per unit time) is converted into an angular displacement per unit time on the basis of the focal length value of a zoom lens. The angular displacement is integrated by an integrator, calculating a blurring correction amount as an integrated angular displacement. In blurring correction, the integrated angular displacement is converted into a memory readout position (=pixel moving amount in the memory) in accordance with the focal length value. Accordingly, blurring correction can be achieved without any influence of a change of the focal length while the same correction as the conventional one is implemented.

In this description, the pixel moving amount per unit time detected as a vector quantity and the pixel moving amount in the memory in correction are generally set equal to each other. At this time, (detected vector quantity)=(memory readout position).

Preferred embodiments of the present invention will be described in detail with reference to the accompanying drawings.

First Embodiment

Figure 1:
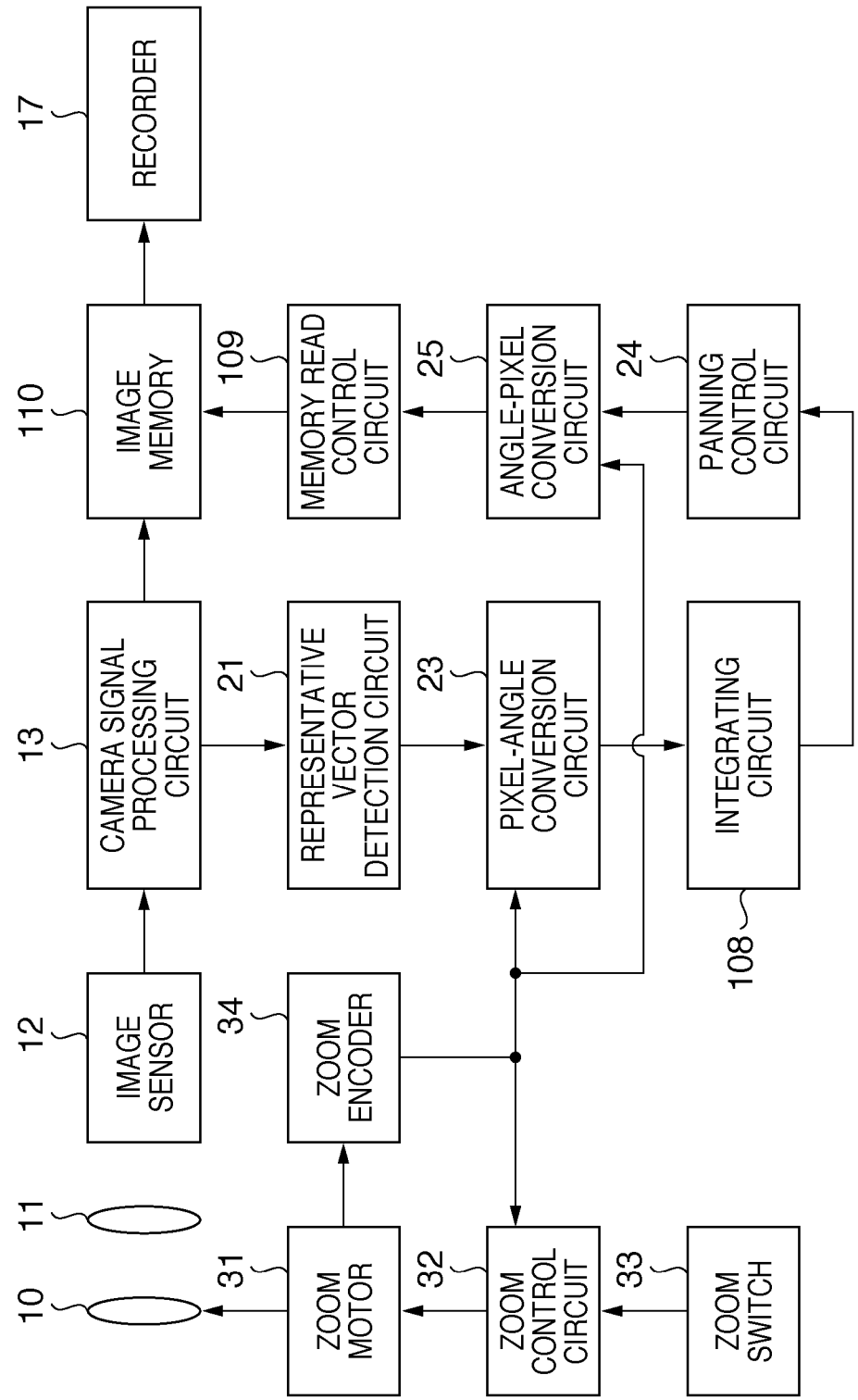
FIG. 1 is a block diagram showing the arrangement of an image capturing apparatus according to the first embodiment of the present invention.

FIG. 1 is a block diagram showing the arrangement of an image capturing apparatus according to the first embodiment of the present invention.

Figure 8:
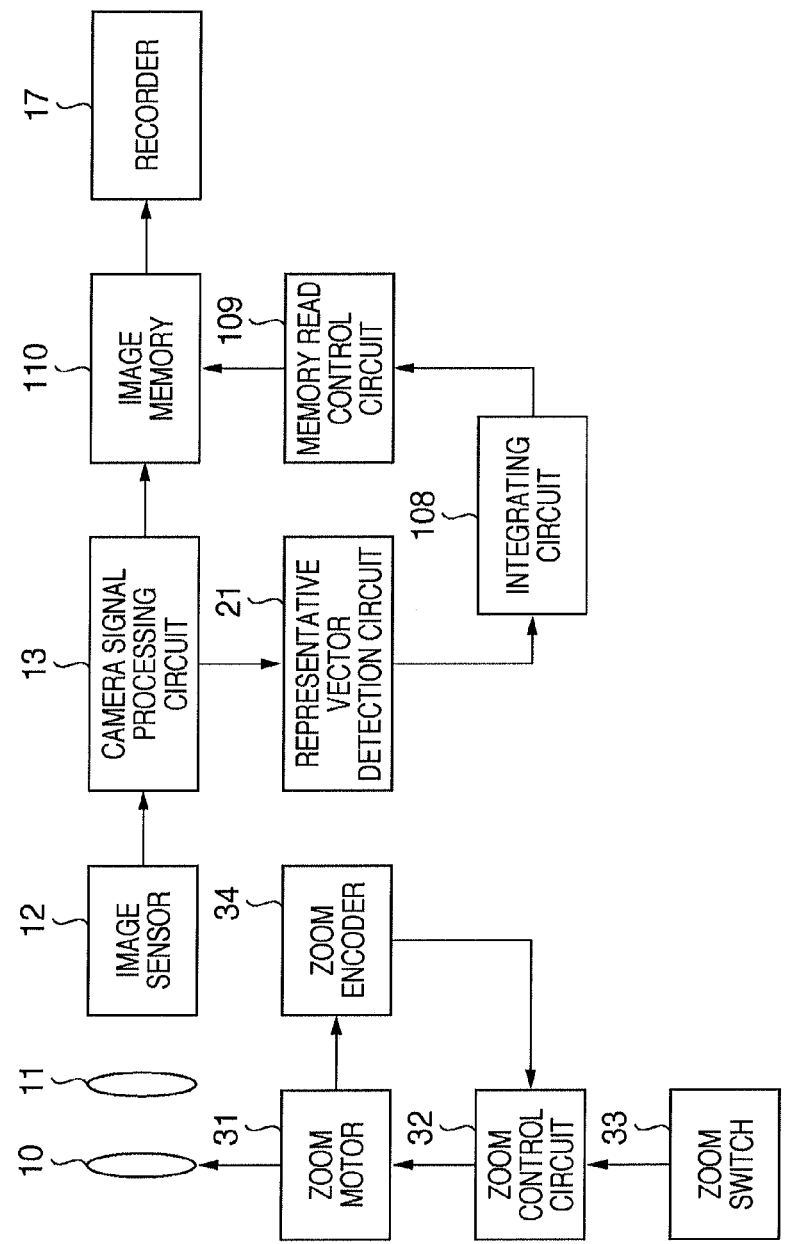
FIG. 8 is a block diagram showing the arrangement of a conventional image capturing apparatus.
Figure 9:
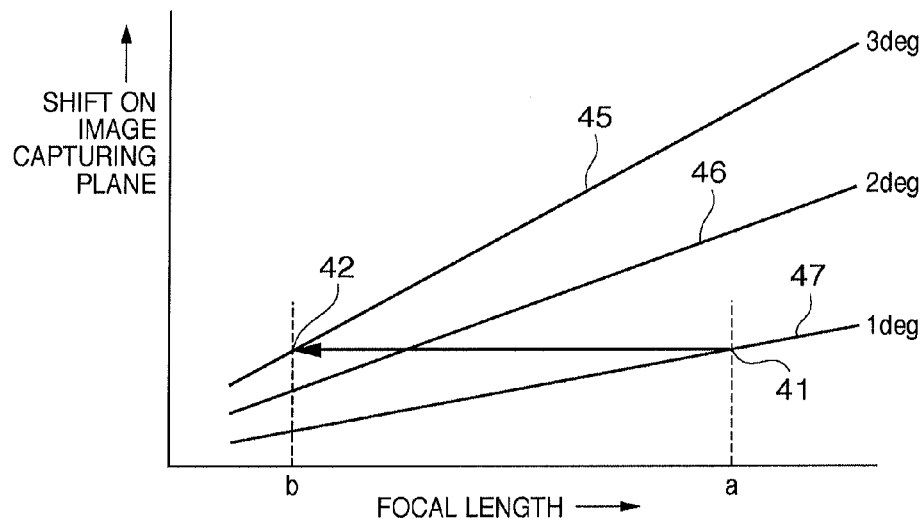
FIG. 9 is a graph showing the image shift on the image capturing plane upon a change of the focal length in the conventional image capturing apparatus.
Figure 10A:
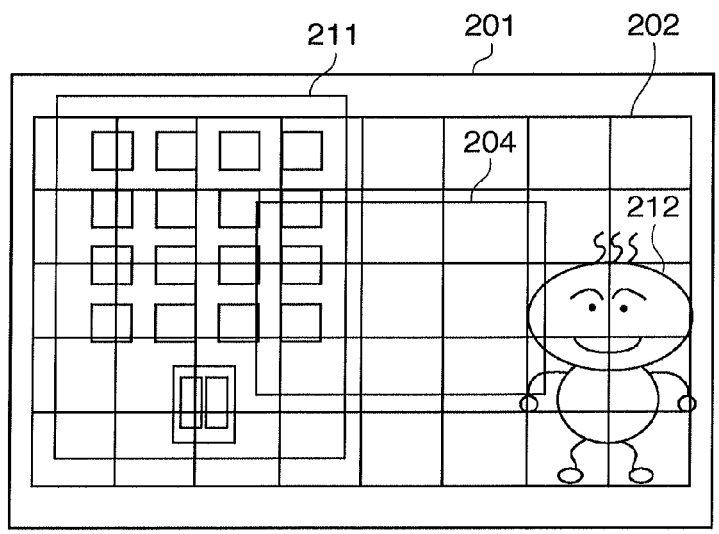
FIG. 10A is a view showing the image shift on the image capturing plane upon a change of the focal length.
Figure 10B:
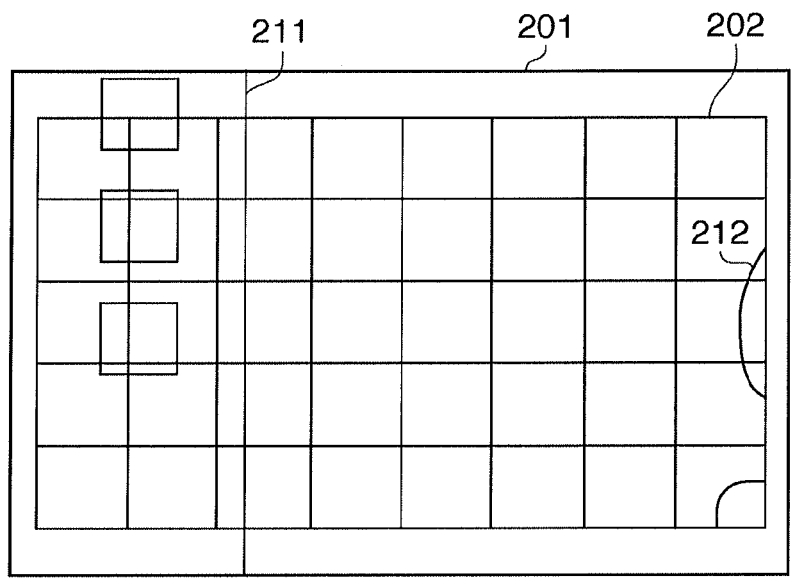
FIG. 10B is a view showing the image shift on the image capturing plane upon a change of the focal length.
Figure 11:
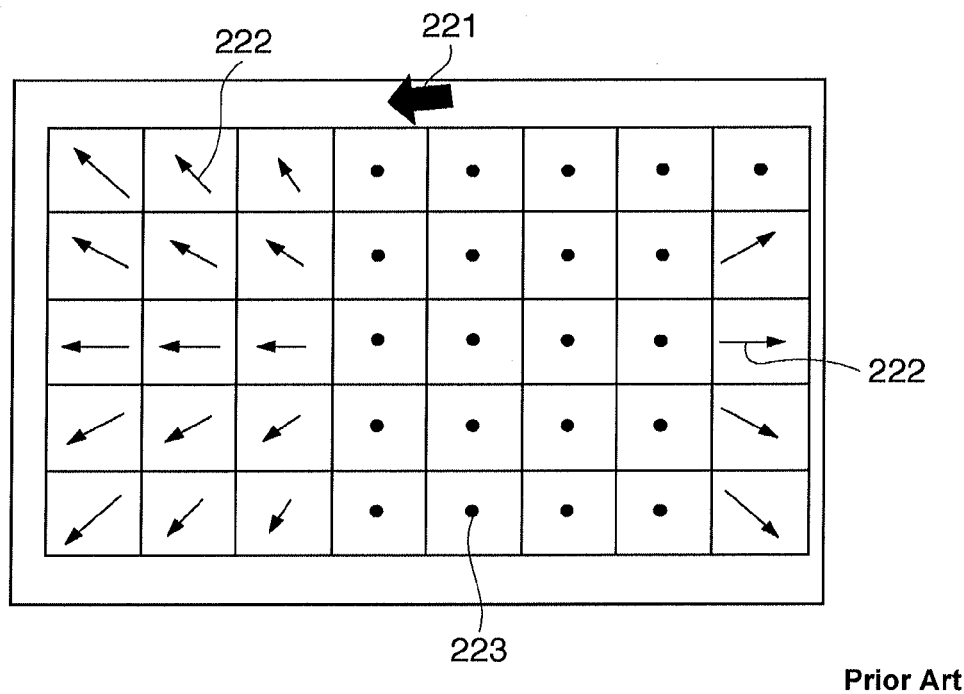
FIG. 11 is a view showing a motion vector generated upon a change of the focal length.

The most part of the image capturing apparatus of the first embodiment shown in FIG. 1 is common to the conventional image capturing apparatus shown in FIG. 8. Thus, the same reference numerals denote the same parts, and a detailed description thereof will be partially omitted.

In FIG. 1, the image capturing apparatus comprises a motor-driven zoom lens (imaging optical system) made up of a zoom lens 10, a zoom switch 33 operated by the user to drive the zoom lens 10 and change the zoom ratio, a zoom control circuit 32 which controls a zoom motor in accordance with the state of the zoom switch 33, a zoom motor 31, and a zoom encoder 34 which detects the position of the zoom lens 10. The position of the zoom lens 10 changes in accordance with the operation of the zoom switch 33. More specifically, it is controlled to move the zoom lens 10 to a target position by driving the zoom motor 31 via the zoom control circuit 32 in accordance with zoom position information input from the zoom switch 33 so that the zoom encoder 34 obtains a value matching the position information.

Information on the zoom lens position (=focal length) obtained by the zoom encoder 34 is also input to a pixel-angle conversion circuit 23 and angle-pixel conversion circuit 25 (to be described later).

An object image formed via the zoom lens 10 and a main optical system 11 on the light receiving surface of an image sensor 12 formed from a CCD or the like is converted into an electrical signal. A camera signal processing circuit 13 converts the electrical signal into a standard video signal or the like as an image signal.

The video signal obtained by the camera signal processing circuit 13 is input to an image memory 110, and also to a representative vector detection circuit 21.

Figure 7:
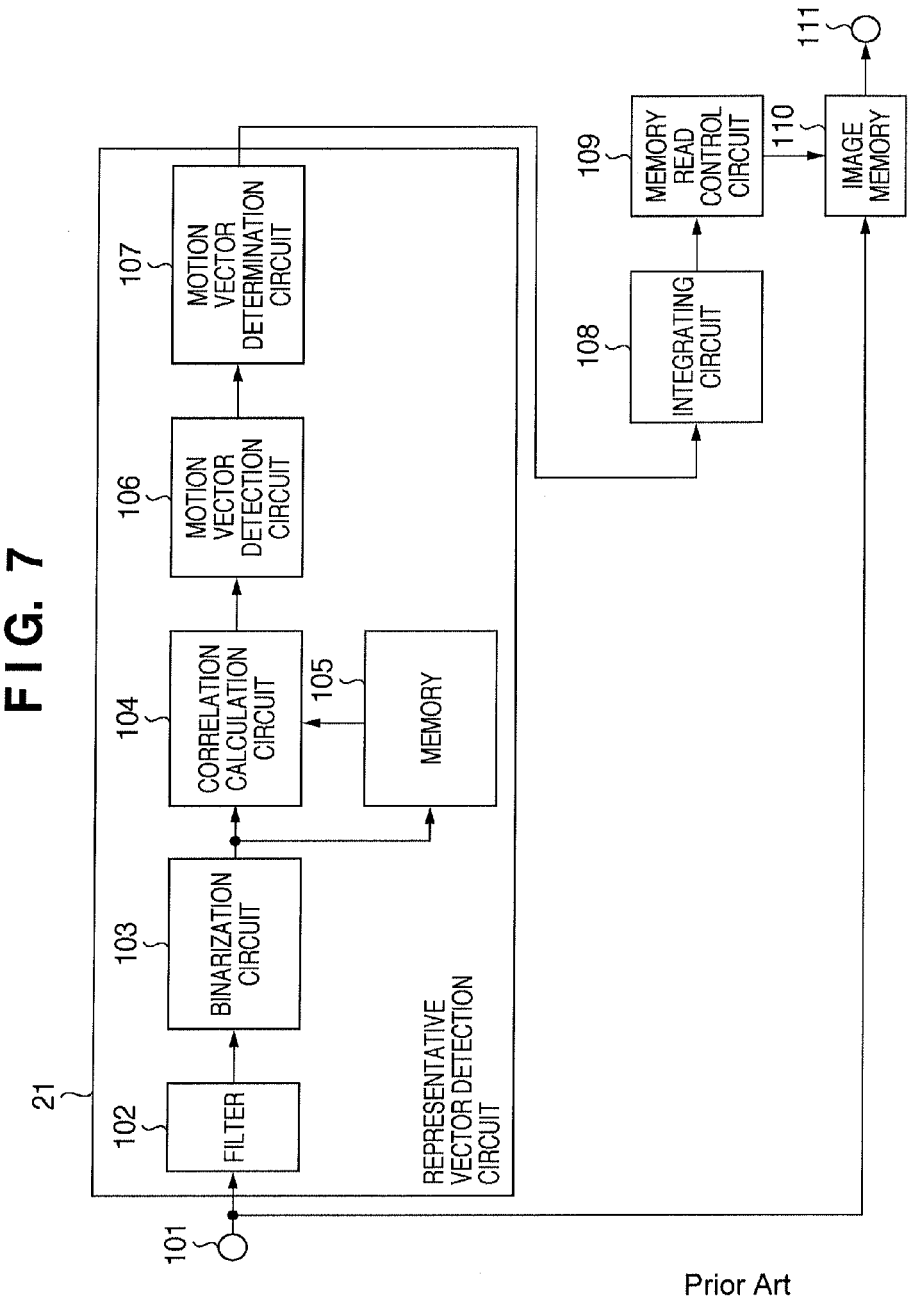
FIG. 7 is a block diagram showing a conventional representative vector detection circuit.

Similar to FIG. 7, the representative vector detection circuit 21 includes a filter 102, binarization circuit 103, correlation calculation circuit 104, memory 105, motion vector detection circuit 106, and motion vector determination circuit 107. The representative vector detection circuit 21 detects the motion vector quantity of the entire frame between images.

As for the motion vector quantity of the entire frame obtained by the representative vector detection circuit 21, the pixel-angle conversion circuit 23 converts a representative vector quantity (=the successively obtained pixel shift amount of the image sensor) into the successively obtained angular displacement (angular displacement amount) of the image on the basis of the value (zoom position change) of the zoom encoder 34. An integrating circuit 108 integrates the angular displacement, obtaining an integrated angular displacement, that is, a shift angle from the optical axis.

Further, a panning control circuit 24 performs panning processing. The angle-pixel conversion circuit 25 converts the shift angle into a correction pixel corresponding to a motion vector quantity (shift amount conversion).

The relationship between the image shift from the center of the optical axis on the image capturing plane, the angle (angular displacement) from the optical axis, and the focal length is given by $$\Delta\theta = \tan^{-1}(\Delta l / f)$$

Δl: successively obtained image shift
f: focal length
Δθ: successively obtained image angular displacement This equation can convert the pixel (=shift amount) into the angular displacement.

The integrated angular displacement θ can be obtained by integration along the time axis, and thus can be given by $$\theta = \int \Delta\theta$$

The angle-pixel conversion circuit 25 converts the integrated angular displacement into a correction pixel (shift amount conversion on the image plane).

The conversion equation is given by $$l = f \times \tan\theta$$

l: integrated image shift (shift amount on the image plane)
f: focal length
θ: integrated image angular displacement A memory read control circuit 109 controls the readout position in the image memory 110 so as to cancel image blurring caused by camera shake in accordance with the correction pixel (corresponding to the integrated shift amount on the image plane (image capturing unit) of the image sensor) converted by the angle-pixel conversion circuit 25. A blurring-corrected video signal is output from the image memory 110 and recorded by a recorder 17. The integrated shift amount l on the image plane is a shift amount from the origin (e.g., the center of the image sensor or the center of the optical axis) of the image sensor.

Figure 2:
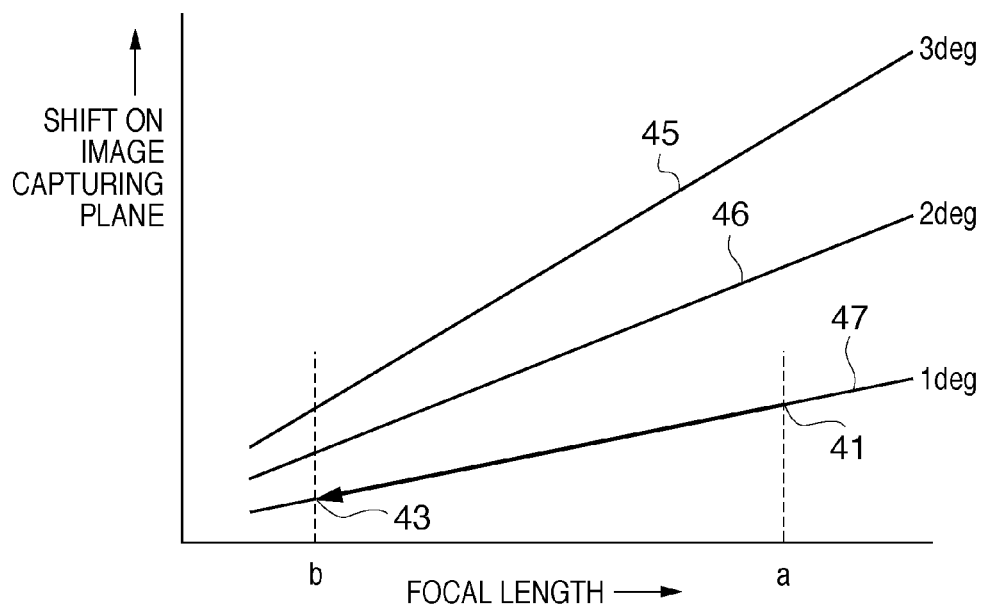
FIG. 2 is a graph showing the image shift on the image capturing plane upon a change of the focal length according to the first embodiment of the present invention.

FIG. 2 is a graph for explaining an operation in zooming.

FIG. 2 is a graph showing an example of the angular displacement and the image shift from the center of the optical axis on the image capturing plane with respect to the focal length. Even if the angular displacement is constant, the image shift from the center of the optical axis on the image capturing plane changes in accordance with the focal length. A characteristic 47 in FIG. 2 represents an image shift from the center of the optical axis in accordance with the focal length for an angular displacement of 1 deg from the optical axis. Similarly, characteristics 46 and 45 represent image shifts from the center of the optical axis in accordance with the focal length for angular displacements of 2 deg and 3 deg.

A case where the zoom lens is driven to change the focal length of the lens from a (long focal length) to b (short focal length) will be examined.

After passing through the panning control circuit 24, the angular displacement integrated by the integrating circuit 108 is converted by the angle-pixel conversion circuit 25 from a shift angle into a correction pixel corresponding to a motion vector quantity. Assume that the angular displacement is 1 deg, and the shift on the image capturing plane is a shift 41. When no vector is detected (the vector quantity is 0) upon a change of the angle of view in zooming, the integrated angular displacement does not change. The shift changes to a value 43 as a result of converting a shift angle into a correction pixel corresponding to a motion vector quantity by the angle-pixel conversion circuit 25. In other words, even if the focal length changes upon the zoom operation, when the integrated angular displacement does not change, the angular displacement remains unchanged even upon conversion from a shift angle into a correction pixel corresponding to a motion vector quantity. Thus, the correction angle can be held.

Second Embodiment

The second embodiment of the present invention will be explained.

The second embodiment reduces a vector quantity detection error and malfunction in zooming by reducing the correction amount for correcting camera shake or setting the correction amount to 0 upon a change of the zoom ratio.

Figure 3:
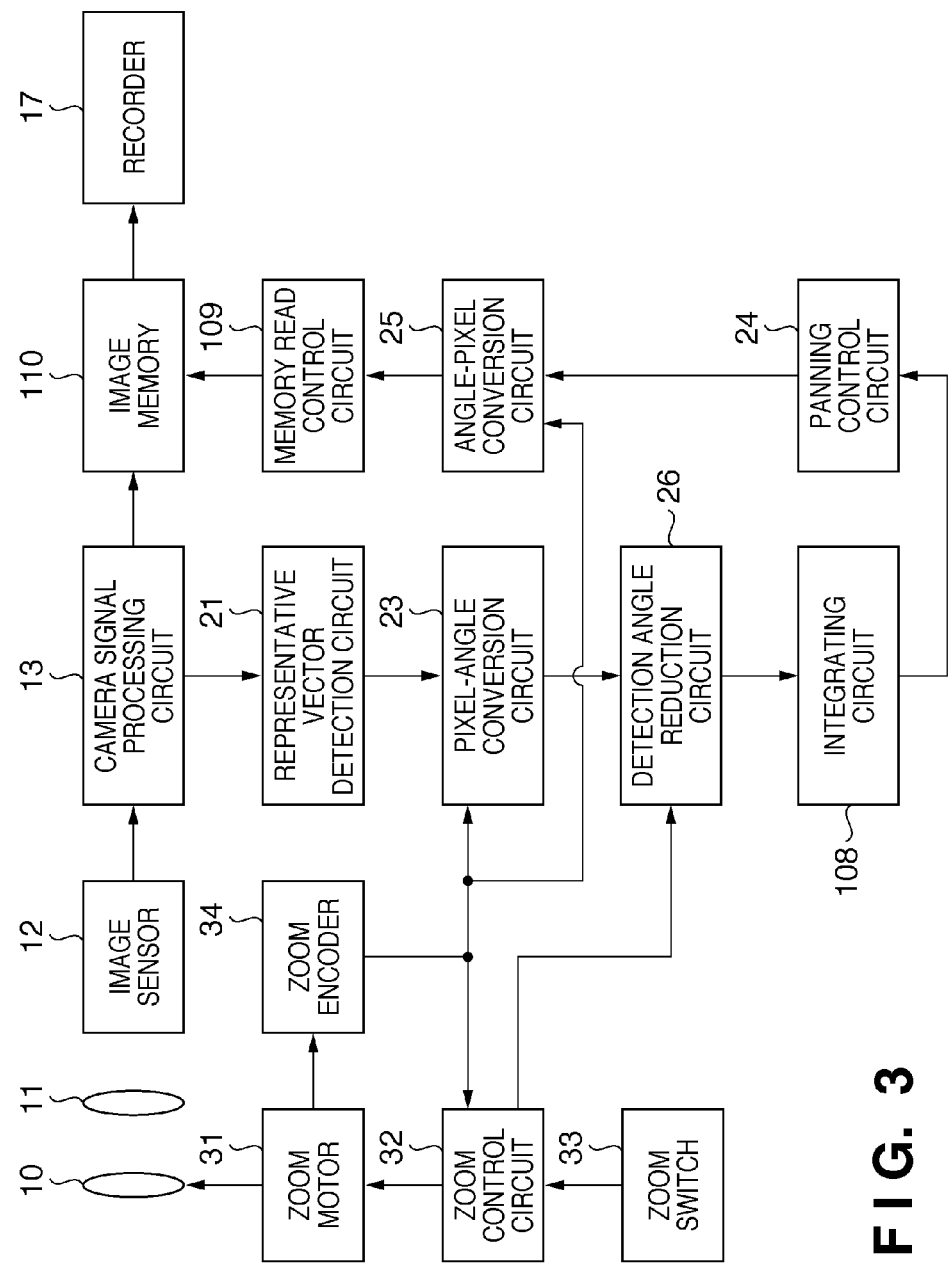
FIG. 3 is a block diagram showing the arrangement of an image capturing apparatus according to the second embodiment of the present invention.

FIG. 3 is a block diagram showing the arrangement of an image capturing apparatus according to the second embodiment of the present invention.

The most part of the image capturing apparatus of the second embodiment shown in FIG. 3 is common to the image capturing apparatus of the first embodiment shown in FIG. 1. Thus, the same reference numerals denote the same parts, and a detailed description thereof will be partially omitted.

In FIG. 3, the image capturing apparatus comprises a motor-driven zoom lens made up of a zoom lens 10, a zoom switch 33 operated by the user to drive the zoom lens 10 and change the zoom ratio, a zoom control circuit 32 which controls a zoom motor in accordance with the state of the zoom switch 33, a zoom motor 31, and a zoom encoder 34 which detects the position of the zoom lens 10. The position of the zoom lens 10 changes in accordance with the operation of the zoom switch 33. More specifically, it is controlled to move the zoom lens 10 to a target position by driving the zoom motor 31 via the zoom control circuit 32 in accordance with zoom position information input from the zoom switch 33 so that the zoom encoder 34 obtains a value matching the position information.

Information on the zoom lens position (=focal length) obtained by the zoom encoder 34 is also input to a pixel-angle conversion circuit 23 and angle-pixel conversion circuit 25 (to be described later). The zoom control circuit 32 outputs the driving speed of the zoom motor 31 to a detection angle reduction circuit 26.

An object image formed via the zoom lens 10 and a main optical system 11 on the light receiving surface of an image sensor 12 formed from a CCD or the like is converted into an electrical signal. A camera signal processing circuit 13 converts the electrical signal into a standard video signal or the like as an image signal.

The video signal obtained by the camera signal processing circuit 13 is input to an image memory 110, and also to a representative vector detection circuit 21.

Similar to FIG. 7, the representative vector detection circuit 21 includes a filter 102, binarization circuit 103, correlation calculation circuit 104, memory 105, motion vector detection circuit 106, and motion vector determination circuit 107. The representative vector detection circuit 21 detects the motion vector quantity of the entire image between fields or frames.

As for the motion vector quantity of the entire frame obtained by the representative vector detection circuit 21, the pixel-angle conversion circuit 23 converts a representative vector quantity (=the pixel shift amount of the image sensor per unit time) into an angular displacement on the basis of the value of the zoom encoder 34.

The detection angle reduction circuit 26 reduces an output from the pixel-angle conversion circuit 23 in accordance with the driving speed of the zoom motor 31 obtained by the zoom control circuit 32.

An integrating circuit 108 integrates the reduced angular displacement, obtaining an integrated angular displacement, that is, a shift angle from the optical axis.

After passing through a panning control circuit 24, the angular displacement integrated by the integrating circuit 108 is converted by the angle-pixel conversion circuit 25 from a shift angle into a correction pixel corresponding to a motion vector quantity.

A memory read control circuit 109 controls the readout position in the image memory 110 so as to cancel image blurring in accordance with the correction pixel converted by the angle-pixel conversion circuit 25. A blurring-corrected video signal is output from the image memory 110 and recorded by a recorder 17.

Control to reduce an output from the pixel-angle conversion circuit 23 in accordance with the zoom speed will be explained with reference to FIG. 4.

Figure 4:
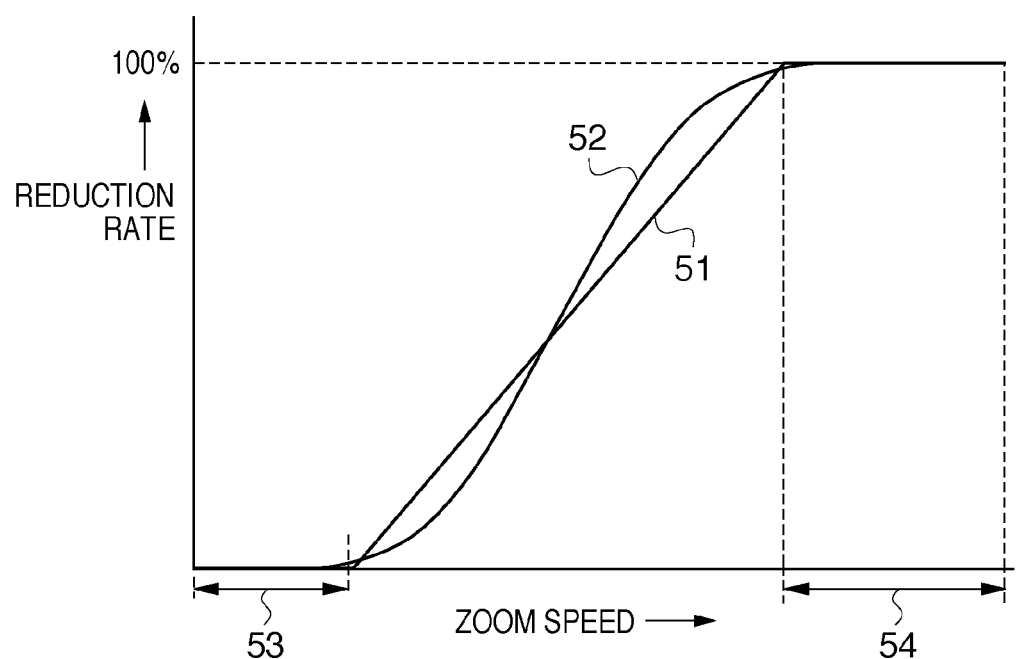
FIG. 4 is a graph showing the reduction rate of the angular displacement amount with respect to the zoom speed according to the second embodiment of the present invention.

In the graph shown in FIG. 4, the abscissa axis represents the zoom speed, for example, the rotational speed of the zoom motor, and the ordinate axis represents the reduction rate of the angular displacement.

A characteristic 51 shown in FIG. 4 is an example of the reduction characteristic of the angular displacement which is an output from the pixel-angle conversion circuit 23. The angular displacement is not reduced in an area 53 where the zoom speed is low. The reduction characteristic continuously changes from 0% to 100% in a medium-speed area. The reduction rate is 100% in an area 54 where the zoom speed is high, and the angular displacement detected from image blurring is reduced to 0.

In motion vector detection, a vector quantity erroneously detected in the zoom operation changes depending on the zoom speed. As a change of the angle of view per unit time is larger, a larger vector quantity is detected. That is, when the zoom speed is high, the vector detection error becomes large, and the malfunction is more frequently caused by the detection error.

However, the second embodiment can prevent the malfunction caused by the detection error because the detected angular displacement is reduced to 0 when the zoom speed is high. When the zoom speed is low, a normal anti-shake operation can be executed.

A characteristic 52 shown in FIG. 4 is an example of a characteristic when the change rate of the reduction characteristic near 0% and 100% is decreased. The characteristic 52 is obtained when an abrupt change of the reduction rate is inhibited regardless of the zoom speed.

Subtraction by the detection angle reduction circuit 26 suffices to multiply an input angular displacement according to the characteristic shown in FIG. 4 in correspondence with the zoom speed. The multiplication coefficient itself is prepared as a data row such as a look-up table corresponding to the zoom speed.

In the second embodiment, the reduction rate of the detection angle reduction circuit 26 is determined in accordance with the moving speed of the zoom lens 10. In addition to the moving speed of the zoom lens 10, the reduction rate may also be set in accordance with the rotational speed of the zoom motor 31 or the change amount of the image magnification.

The zoom lens 10 is driven by the zoom motor 31 in the second embodiment, but may also be manually adjusted by the user. In this case, it suffices to acquire the zoom speed using, for example, the zoom encoder 34 which detects the motion of a zoom ring operated by the user. That is, it suffices to acquire the change amount of the zoom position per unit time, similar to the driving speed.

Third Embodiment

The third embodiment of the present invention will be explained.

The third embodiment reduces the influence of a vector quantity detection error and malfunction in zooming by changing the reduction rate of the camera shake correction amount or setting the correction amount to 0 in consideration of the focal length, unlike the second embodiment. More specifically, on the wide-angle side on which the focal length is short, the influence of camera shake on a captured image is small, and a change of the object by the zoom operation is generally large because the angle of view is wide. Thus, priority is given to preventing the malfunction, reducing the correction amount from a low zoom speed. To the contrary, on the telephoto side on which the focal length is long, the influence of camera shake on a captured image is large, and a change of the object is generally small because the angle of view is narrow. Hence, priority is given to the anti-shake effect.

Figure 5:
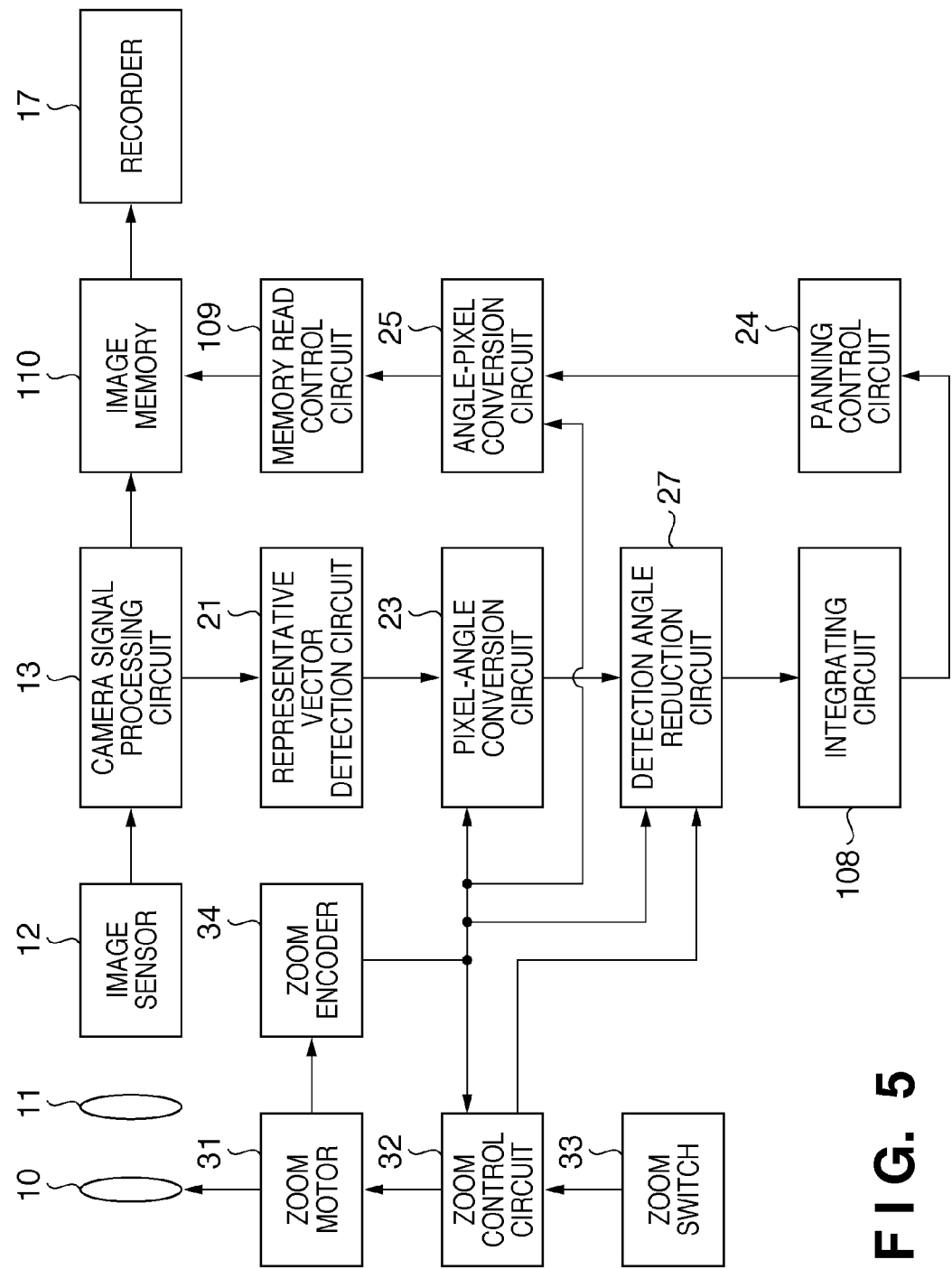
FIG. 5 is a block diagram showing the arrangement of an image capturing apparatus according to the third embodiment of the present invention.

FIG. 5 is a block diagram showing the arrangement of an image capturing apparatus according to the third embodiment of the present invention.

The most part of the image capturing apparatus of the third embodiment shown in FIG. 5 is common to the image capturing apparatus of the second embodiment shown in FIG. 3. Thus, the same reference numerals denote the same parts, and a detailed description thereof will be partially omitted.

In FIG. 5, the image capturing apparatus comprises a motor-driven zoom lens made up of a zoom lens 10, a zoom switch 33 operated by the user to drive the zoom lens 10 and change the zoom ratio, a zoom control circuit 32 which controls a zoom motor in accordance with the state of the zoom switch 33, a zoom motor 31, and a zoom encoder 34 which detects the position of the zoom lens 10. The position of the zoom lens 10 changes in accordance with the operation of the zoom switch 33. More specifically, it is controlled to move the zoom lens 10 to a target position by driving the zoom motor 31 via the zoom control circuit 32 in accordance with zoom position information input from the zoom switch 33 so that the zoom encoder 34 obtains a value matching the position information.

Information on the zoom lens position (=focal length) obtained by the zoom encoder 34 is also input to a pixel-angle conversion circuit 23, angle-pixel conversion circuit 25, and detection angle reduction circuit 27 (to be described later). The zoom control circuit 32 outputs the driving speed of the zoom motor 31 to the detection angle reduction circuit 27.

An object image formed via the zoom lens 10 and a main optical system 11 on the light receiving surface of an image sensor 12 formed from a CCD or the like is converted into an electrical signal. A camera signal processing circuit 13 converts the electrical signal into a standard video signal or the like as an image signal.

The video signal obtained by the camera signal processing circuit 13 is input to an image memory 110, and also to a representative vector detection circuit 21.

Similar to FIG. 7, the representative vector detection circuit 21 includes a filter 102, binarization circuit 103, correlation calculation circuit 104, memory 105, motion vector detection circuit 106, and motion vector determination circuit 107. The representative vector detection circuit 21 detects the motion vector quantity of the entire image.

As for the motion vector quantity of the entire frame obtained by the representative vector detection circuit 21, the pixel-angle conversion circuit 23 converts a representative vector quantity (=the pixel shift amount of the image sensor per unit time) into an angular displacement based on the value of the zoom encoder 34.

The detection angle reduction circuit 27 reduces an output from the pixel-angle conversion circuit 23 in accordance with the focal length, and the driving speed of the zoom motor 31 obtained by the zoom control circuit 32.

An integrating circuit 108 integrates the reduced angular displacement, obtaining an integrated angular displacement, that is, a shift angle from the optical axis.

After passing through a panning control circuit 24, the angular displacement integrated by the integrating circuit 108 is converted by the angle-pixel conversion circuit 25 from a shift angle into a correction pixel corresponding to a motion vector quantity, that is, into a shift amount on the image plane of the image sensor 12.

A memory read control circuit 109 controls the readout position in the image memory 110 so as to cancel image blurring in accordance with the correction pixel converted by the angle-pixel conversion circuit 25. A blurring-corrected video signal is output from the image memory 110 and recorded by a recorder 17.

Control to reduce an output from the pixel-angle conversion circuit 23 in accordance with the zoom speed and a change of the focal length will be explained with reference to FIG. 6.

Figure 6:
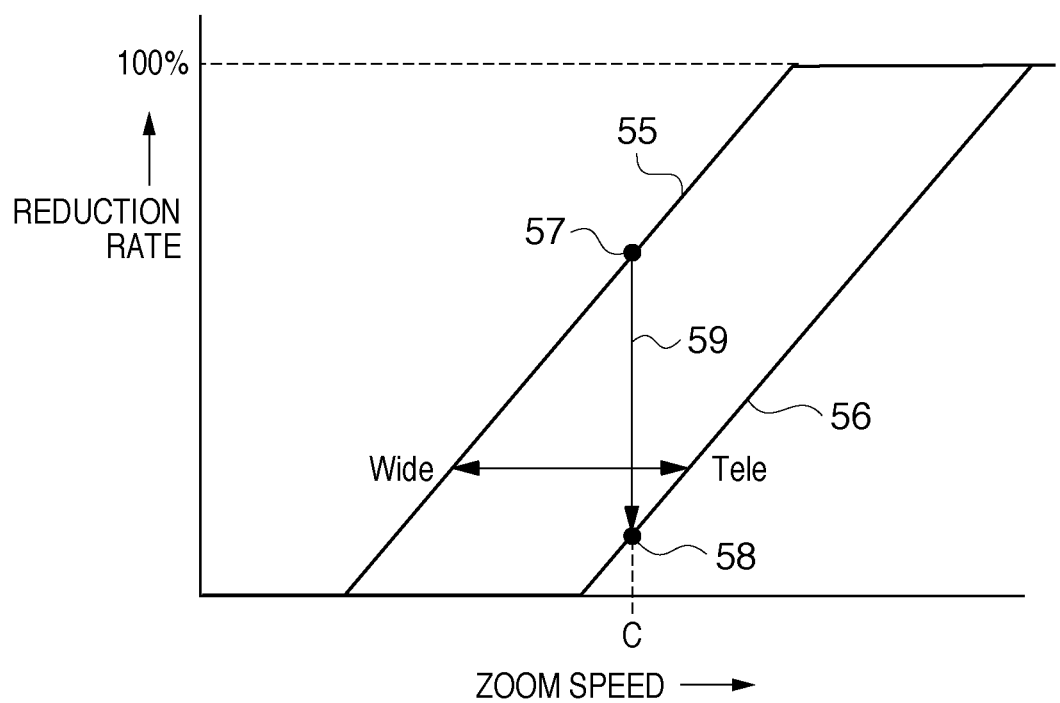
FIG. 6 is a graph showing the reduction rate of the angular displacement amount with respect to the zoom speed according to the third embodiment.

In the graph shown in FIG. 6, the abscissa axis represents the zoom speed, for example, the rotational speed of the zoom motor 31, and the ordinate axis represents the reduction rate of the angular displacement.

A characteristic 55 shown in FIG. 6 is an example of the reduction characteristic of the angular displacement which is an output from the pixel-angle conversion circuit 23. The characteristic 55 represents a reduction characteristic when the focal length represents the wide-angle side. A characteristic 56 represents a reduction characteristic when the focal length represents the telephoto side.

A case where the zoom operation is executed from the wide-angle side to the telephoto side while the zoom speed is constant will be explained. When the zoom operation starts from the wide-angle side at a zoom speed C in FIG. 6, a reduction rate at a point 57 is set. The zoom operation continues subsequently, and as the focal length comes close to the telephoto side, the reduction rate decreases as indicated by an arrow 59, and reaches a point 58 on the telephoto side.

This reduction rate control can reduce the influence of a vector quantity detection error and malfunction in zooming.

Also in the third embodiment, the user may also manually adjust the zoom lens. In this case, it suffices to acquire the zoom speed using, for example, the zoom encoder 34 which detects the motion of a zoom ring operated by the user. That is, it suffices to acquire the change amount of the zoom position per unit time, similar to the driving speed.

Other Embodiments

The object of the embodiments is also achieved by the following method. More specifically, a storage medium (or recording medium) which stores the program codes of software for implementing the functions of the above-described embodiments is supplied to a system or apparatus. The computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

Further, the present invention includes the following case. More specifically, the program codes read out from the storage medium are written in the memory of a function expansion card inserted into the computer or the memory of a function expansion unit connected to the computer. Then, the CPU of the function expansion card or function expansion unit performs part or all of actual processing on the basis of the instructions of the program codes, thereby implementing the functions of the above-described embodiments.

When the present invention is applied to the storage medium, the storage medium stores program codes corresponding to the above-described sequences.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-326586, filed Dec. 18, 2007, which is hereby incorporated by reference herein in its entirety.

What is claimed is:

1. An image capturing apparatus comprising:
    an image capturing unit which converts, into an image signal, an object image formed by an imaging optical system including a zoom lens;
    an image memory which stores an image signal obtained by said image capturing unit;
    a motion vector detection unit which detects a motion vector representing a shift amount between a stored image and an obtained image by said image capturing unit;
    an angle conversion unit which converts the motion vector detected by said motion vector detection unit into a pixel shift of the image capturing unit between the images on the basis of a first focal length;
    a shift angle calculation unit which calculates a shift angle from an optical axis of the imaging optical system based on the pixel shift calculated by said angle conversion unit, the shift angle being an integrated angular displacement from the optical axis;
    a correction pixel conversion unit which converts the shift angle calculated by said shift angle calculation unit into a correction pixel on an image plane of said image capturing unit on the basis of a second focal length, the second focal length being different from the first focal length; and
    a correction unit which corrects a shift to control a readout position in the stored image so as to cancel image blurring in the stored image in accordance with the correction pixel amount on the image plane,
    wherein a plurality of locus curves each representing a relationship between a quantity of the motion vector and the focal length with respect to each amount of the angular displacement are stored in the image memory,
    wherein the quantity of the motion vector varies in accordance with variation of the focal length with respect to each of the locus curves, and
    wherein the first focal length and the second focal length are sampled at different timings.

2. The apparatus according to claim 1, further comprising an image memory which stores an image signal obtained by said image capturing unit,
    wherein said correction unit performs shift correction by controlling a readout position of the image signal from said image memory on the basis of the shift amount on the image plane.

3. The apparatus according to claim 1, further comprising a reduction unit,
said reduction unit reducing the angular displacement amount obtained by said angle conversion unit in accordance with a change amount of the zoom position of the zoom lens per unit time.

4. The apparatus according to claim 1, further comprising a reduction unit,
said reduction unit reducing the pixel shift in accordance with the zoom position and a change amount of the zoom position of the zoom lens per unit time, wherein as the change amount of the zoom position per unit time become larger, the reduction unit sets reduction rates of the pixel shift higher.

5. A method of controlling an image capturing apparatus including an image capturing unit which converts, into an image signal, an object image formed by an imaging optical system including a zoom lens, the method comprising:
a storing step of storing an image signal obtained by the image capturing unit into an image memory;
a motion vector detection step of detecting a motion vector quantity representing a shift amount between a stored image and an obtained image by the image capturing unit;
an angle conversion step of converting the motion vector quantity detected in the motion vector detection step into a pixel shift of the image capturing unit between the images on the basis of a first focal length;
a shift angle calculation step of calculating a shift angle from an optical axis of the imaging optical system based on the pixel shift by calculating the pixel shift obtained in the angle conversion step, the shift angle being an integrated angular displacement from the optical axis;
a shift amount conversion step of converting the shift angle into a correction pixel amount on an image plane of the image capturing unit on the basis of a second focal length, the second focal length being different from the first focal length; and
a correction step of correcting a shift to control a readout position in the stored image so as to cancel image blurring in the stored image in accordance with the correction pixel amount on the image plane,
wherein a plurality of locus curves each representing a relationship between a quantity of the motion vector and the focal length with respect to each amount of the angular displacement are stored in the image memory,
wherein the quantity of the motion vector varies in accordance with variation of the focal length with respect to each of the locus curves, and
wherein the first focal length and the second focal length are sampled at different timings.

6. A non-transitory computer readable medium storing a program which causes a computer to execute a control method defined in claim 5.

7. An image capturing apparatus comprising:
an image capturing unit which converts, into an image signal, an object image formed by an imaging optical system including a zoom lens;
an image memory which stores an image signal obtained by said image capturing unit;
a motion vector detection unit which detects a motion vector quantity representing a shift amount between images from image signals successively obtained by said image capturing unit;
an angle conversion unit which converts the motion vector quantity detected by said motion vector detection unit into an angular displacement amount between the images on the basis of a first zoom position of the zoom lens;
a shift angle calculation unit which calculates a shift angle from an optical axis of the imaging optical system by calculating the angular displacement amount obtained by said angle conversion unit;
a shift amount conversion unit which converts the shift angle calculated by said shift angle calculation unit into a shift amount on an image plane of said image capturing unit on the basis of a second zoom position of the zoom lens; and
a correction unit which corrects a shift on the basis of the shift amount on the image plane,
wherein said correction unit performs shift correction by controlling a readout position of the image signal from said image memory on the basis of the shift amount on the image plane,
wherein a plurality of locus curves each representing a relationship between the motion vector quantity and a zoom position of the zoom lens with respect to each amount of the angular displacement are stored in the image memory,
wherein the motion vector quantity varies in accordance with variation of the zoom position of the zoom lens with respect to each of the locus curves, and
wherein the first zoom position of the zoom lens and the second zoom position of the zoom lens are sampled at different timings.

8. A method of controlling an image capturing apparatus including an image capturing unit which converts, into an image signal, an object image formed by an imaging optical system including a zoom lens, the method comprising;
a storing step of storing an image signal obtained by the image capturing unit into an image memory;
a motion vector detection step of detecting a motion vector quantity representing a shift amount between images from image signals successively obtained by said image capturing unit;
an angle conversion step of converting the motion vector quantity detected by said motion vector detection step into an angular displacement amount between the images on the basis of a first zoom position of the zoom lens;
a shift angle calculation step of calculating a shift angle from an optical axis of the imaging optical system by calculating the angular displacement amount obtained by said angle conversion step;
a shift amount conversion step of converting the shift angle calculated by said shift angle calculation step into a shift amount on an image plane of said image capturing unit on the basis of a second zoom position of the zoom lens; and
a correction step of correcting a shift on the basis of the shift amount on the image plane,
wherein said correction step performs shift correction by controlling a readout position of the image signal from said image memory on the basis of the shift amount on the image plane,
wherein a plurality of locus curves each representing a relationship between the motion vector quantity and a zoom position of the zoom lens with respect to each amount of the angular displacement are stored in the image memory,
wherein the motion vector quantity varies in accordance with variation of the zoom position of the zoom lens with respect to each of the locus curves, and wherein the first zoom position of the zoom lens and the second zoom position of the zoom lens are sampled at different timings.

* * * * *